Aug. 5, 1941.   A. B. SEVERN   2,251,897
THREAD PROTECTOR
Filed May 11, 1939
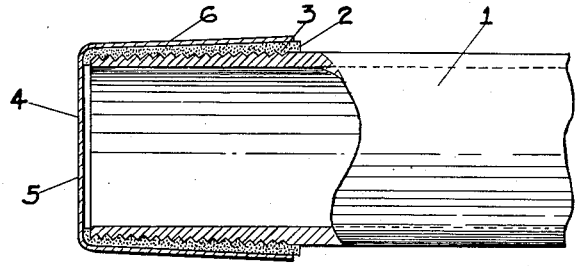
Fig 1.
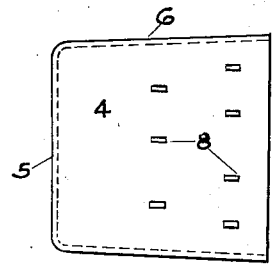
Fig 2.
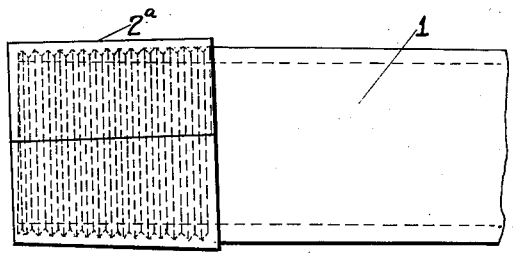
Fig 3.
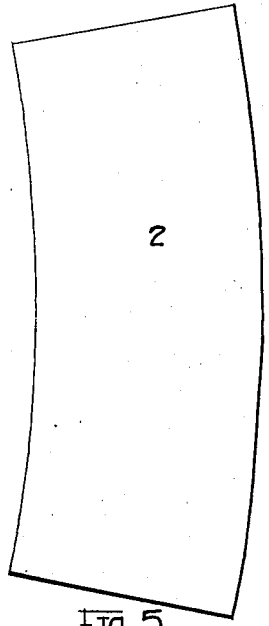
Fig 5.
Fig 4.
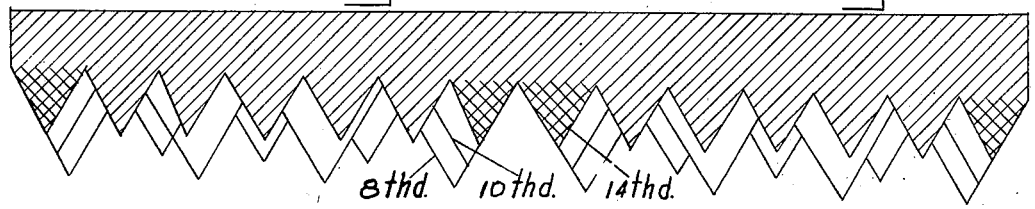
Fig 6.
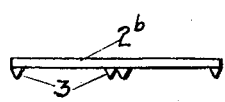
Fig 7.
INVENTOR.
Arthur B. Severn
BY
ATTORNEYS.

Patented Aug. 5, 1941

2,251,897

UNITED STATES PATENT OFFICE 2,251,897

THREAD PROTECTOR

Arthur B. Severn, Pittsburgh, Pa.; Helen R. Severn administratrix of said Arthur B. Severn, deceased Application May 11, 1939, Serial No. 273,017

2 Claims. (Cl. 138—96)

This invention pertains to devices for protecting threaded portions of pipe and similarly threaded members during shipment thereof and when in process of loading, unloading and storage. Because of the well-known necessity for protecting the threaded ends of pipe and other threaded members from injury during handling, storage and shipment many devices have been produced for this purpose. Their success can best be judged by the fact that the standard known means, among large producers of pipe, for effecting this protection is a steel pipe coupling which is threaded upon the pipe by hand or machine. This method is acknowledged to be not only uneconomical because of the cost of the coupling but also because of the tendency of the coupling to loosen and fall off when jarred in handling.

The requisites of a desirable thread protector are conceded to be low first cost, such as to permit discarding after a single use; ease of assembly by unskilled labor; effective protection of threads against water, dirt and injury from impact with other objects; and a design of protector which not only facilitates assembly and removal but which resists accidental removal and loss.

An object of my invention is to provide a thread protector having the foregoing requisites.

Another object of my invention is to provide a protector comprising several parts which are assembled directly upon the portion of the member to be protected and which is removable as a unit.

A further object of my invention is the provision of a pre-formed thread engaging member which is of novel design and is adaptable to a variety of sizes of threads and diameters of pipe.

In the drawing Fig. 1 shows a section of threaded pipe with the filler and protector cup assembled thereon; Fig. 2 shows in elevation the protector cup; Fig. 3 shows an alternate form of wrapping the filler on the pipe threads; Fig. 4 shows a portion of the filler of Fig. 3; Fig. 5 shows the filler of Fig. 1; Fig. 6 shows a section of pipe threads of various threads per inch; Fig. 7 shows an alternate form of threads for the filler 2 or 2ª.

My invention contemplates the use of a relatively soft filler which embraces and engages the threaded portions of the pipe for the dual purpose of protection and of securing the thread protector in place; and a metal outer cup embracing the filler to protect same from injury when the protector is assembled and of a design which prohibits removal thereof separately from the filler.

For the filler I propose to use either papier-mâché, a relatively soft and thick fibrous paper, or other suitable material having suitable thread projections on one side thereof so that the filler when manually wound around the threaded portion of the pipe engages with the threads thereof and effectively prevents axial removal.

The most common threads in use today on small, medium and large diameter pipe are 8, 10, 11½ and 14 threads to the inch and are tapered $\frac{1}{16}$, $\frac{3}{8}$ and $\frac{3}{4}$ inch per foot of length. The $\frac{3}{4}$ inch taper being standard.

The filler is provided in suitable widths appropriate for the length of threaded portion of pipe being protected and the required threads are formed on one face thereof. The length of filler may be such as to correspond to approximately the periphery of the desired size of pipe. Because of the taper of the threaded portion of the pipe, the filler to fit accurately around the threads of the pipe should have arcuate side edges and tapered end edges with threads suitably disposed in relation to the side edges of the filler. I have found that straight edged strips of filler will serve the purpose and have the added advantage in that rolls of filler can be provided from which suitable lengths can be cut or torn depending upon the diameter of pipe being protected. These strips can be wound slightly askew around the pipe as shown in Fig. 3 of the drawing.

The metal cup is of thin sheet metal which may be stamped out of flat plate in large quantities at low cost. This metal cup has a closed preferably circular bottom wall and circular side walls which when made tapered may be that which corresponds to the standard taper of threaded pipes or any other suitable taper. It will be obvious that the walls may be made straight and without taper if desired. The side walls are joined with the bottom wall to form rounded portions materially larger in radius than the thickness of metal forming the cup shaped metal member. The inside diameter of the cup shaped member is preferably equal to or slightly greater than the outside diameter of the pipe plus the filler. As shown in the drawing the free ends of the side walls of the member are straight but if desired a beading may be formed on this edge to further stiffen the cup.

Referring now to the drawing where like reference characters refer to like parts, reference character 1 indicates a section of pipe having a threaded end portion. A filler 2 having threads 3 on one face thereof is wound around the threaded end portion of the pipe so as to substantially cover the periphery of the pipe threads and having the threads of the filler in engagement with the threads of the pipe. This filler is of sufficient width to extend across the threads and project beyond the end of the member 1. The metal cup 4 which is preferably of thin gauge metal has a closed circular end wall 5 and tapered side walls 6. The side walls 6 when tapered are approximately of the same taper as that of the pipe threads and the inside diameter of the side walls 6 is preferably equal to or slightly greater than the outside diameter of the filler so that the cup may be readily moved over the filler. Because of the taper the open end of the cup will readily move over the end of the pipe; but if the inside diameter of the cup adjacent the open end is equal to or less than the outside diameter of the filler sufficient effort must be exerted to compress the filler as the cup moves into position, which is not desirable. Any considerable force exerted in this operation may damage the cup and in any event slows up the assembling of the filler and cup upon the pipe. It will be obvious these side walls 6 may be made straight instead of tapered.

As the base 5 of the cup approaches the end of the pipe the curved juncture between the walls and base of the cup crimps the filler around the end of the pipe to form protective surfaces for the ends of the pipe and thread.

When the protector has been so assembled the cup is struck with a sharp instrument at a plurality of points around the periphery of walls 6 causing indentations or tangs 8 to be formed which engage the filler to effectively resist relative movement between the cup and filler and prevent removal of the cup from the pipe in the same manner as it was assembled upon the pipe. It is obvious, however, that when a wrench is applied around the protector, the filler and cup may be unscrewed as a unit.

Referring now to Figs. 1 and 5 of the drawing, the filler 2 is shaped to fit the threaded end of the pipe and the threads 3 are rolled correspondingly. In Fig. 4 of the drawing the filler 2ª is formed in long strips with the threads parallel with the sides of the filler. Here the required length of filler is torn from the strip and the filler is wound upon the pipe threads so that the filler is slightly askew and for this reason the ends of the filler are torn slightly at an angle to form a square meeting edge between the two ends of the filler. Obviously the filler will not project beyond the end of the pipe the same distances around the periphery thereof but the variation is not sufficient to be troublesome and there is preferably some projection beyond each portion of the periphery of the pipe.

In each of the foregoing examples of filler the threaded portion has been made to correspond to the particular threads being protected. In Fig. 7 an alternate form of filler is shown. I have found that threads of 8, 10, and 14 per inch which are the ones most commonly used will coincide at three points along each inch of threaded length of pipe as shown by cross hatching in Fig. 6 of the drawing. I have accordingly placed threads on the filler 2ᵇ at these points only and made the thread of a depth not greater than that of the least depth of thread. Obviously a filler 2ª of this type of threads can be made in strips of any length and the required amount torn off to provide a single filler fitting a plurality of pipe diameters and sizes of threads or this arrangement of thread may be formed on the filler 2. The three points of engagement spaced across the filler and extending around the periphery of the pipe provide sufficient strength to resist axial stripping of the protector from off the pipe.

I am aware that others have previously provided soft unthread fillers for use with metal protector cups of less inside diameter than the outside diameter of the assembled filler and pipe, intending the protector cup to crush the filler into the pipe threads and cause frictional engagement between filler and cup to retain them assembled upon the pipe.

My protector has several obvious and desirable advantages over these previous fillers. The depth of thread on a filler as herein disclosed is greater than any which can possibly be provided by the previous methods above mentioned. This assures greater resistance to stripping of the protector from off the pipe with an axial movement. A filler as herein disclosed can be made thicker without increasing the size of the metal cup. This not only saves metal but also increases the amount the protector projects beyond the periphery of the unthreaded portion of the pipe thereby providing increased protection at the threads but also increases the area of filler engaged between the threads of the pipe thereby providing increased resistance to forces tending to strip the filler from the pipe. It will also be obvious that increasing the thickness of the filler also increases the resiliency thereof so that in the fillers of the prior art the depth of thread formed does not increase proportionately with the increase in thickness of filler or with the increased pressure applied to the thickened filler.

The filler herein disclosed may be used with a plurality of pipe sizes and sizes of threads thereby reducing the number of sizes of filler necessary.

It will be obvious to those skilled in the art that my protector may also be used with internally threaded pipe by disposing the filler within the pipe and using the protector as a plug to hold the filler in place.

I claim:

1. In a pipe thread protector of the character described, a filler member adapted for use with a plurality of different diameters of pipe having standard even thread sizes falling within a predetermined minimum and maximum number of threads per inch of threaded length of pipe and comprising a long rectangularly shaped strip of relatively soft material having formed on one face thereof threads shaped to correspond to the size of the pipe thread of the said maximum number of threads and spaced to engage only the pipe thread at both ends and at the middle of each inch of length of thread of the minimum number of threads per inch, said filler member being prepared for use by cutting off from the said long strip the required length of filler to suit the periphery of pipe with which it is used.

2. The method of protecting threaded ends of pipe comprising wrapping a length of relatively soft and thick non-metallic filler material having threads formed on one face thereof around the threaded end of the pipe with the filler threads in engagement with the pipe threads, sliding a cup shaped metal member over the filler for securing the filler in position, and forming in the assembled cup and filler a plurality of indentations to lock the filler to the cup member and to the pipe threads to prevent removal of the cup shaped member independently of the filler.

ARTHUR B. SEVERN.